United States Patent [19]
Yu

[11] Patent Number: 5,959,837
[45] Date of Patent: Sep. 28, 1999

[54] HEAT-RADIATING STRUCTURE FOR CPU

[75] Inventor: Shu-Jen Yu, Taipei, Taiwan

[73] Assignee: Ideal Electronics Inc., Taipei, Taiwan

[21] Appl. No.: 09/054,513

[22] Filed: Apr. 3, 1998

[51] Int. Cl.$^6$ ....................................... H05K 7/20
[52] U.S. Cl. ................ 361/697; 165/80.3; 165/80.4; 165/104.33; 165/122; 174/15.2; 174/16.3; 361/700
[58] Field of Search ................... 174/15.2, 16.3; 165/80.2, 80.3, 80.4, 80.5, 121, 122, 104.33, 185; 361/695–697, 700–703

[56] References Cited

U.S. PATENT DOCUMENTS

| | | | |
|---|---|---|---|
| 5,285,347 | 2/1994 | Fox et al. ............................. | 361/695 |
| 5,339,214 | 8/1994 | Nelson ................................. | 361/695 |
| 5,598,320 | 1/1997 | Toedtman et al. ................... | 361/700 |
| 5,706,169 | 1/1998 | Yeh ..................................... | 361/697 |

*Primary Examiner*—Gregory Thompson

[57] ABSTRACT

Disclosed is a heat-radiating structure for CPU mainly including a radiating seat, at least one thermal pipe, a radiating member, and a cooling fan. The radiating seat is connected to a radiating block attached to the CPU, so that heat produced by the CPU can be transmitted to the radiating seat via the radiating block. The at least one thermal pipe is connected at one end to the radiating seat and at the other end to the radiating member to enhance heat transmission from the radiating seat to the radiating member. The cooling fan is screwed to one side surface of the radiating member to speed dissipation of heat transmitted to the radiating member.

4 Claims, 4 Drawing Sheets

HEAT-RADIATING STRUCTURE FOR CPU

FIELD OF THE INVENTION

The present invention relates to a heat-radiating structure for CPU of a computer and mainly includes a radiating seat, a pair of thermal pipes, a radiating member, and a cooling fan. The radiating seat is fitly attached to the CPU. The thermal pipes are partially received in a central portion of the radiating seat with another ends opposite to the radiating seat connected to the radiating member, so that the radiating member cooperates with the cooling fan to dissipate large volume of heat produced by the CPU.

DESCRIPTION OF THE PRIOR ART

In a conventional way of dissipating heat produced by a CPU, the CPU is centered on an aluminum radiating plate. A radiating block 5 having a through hole 51 and a recess 52 at two sides thereof is fixed to a surface of the CPU. The radiating block 5 is generally similar to the element in FIG. 1 indicated by reference numeral "5". While the CPU operates at a very high speed and produces a large volume of heat during its operation, the radiating block 5 cools the CPU by radiating the produced heat at a rate apparently slower than that at which the heat is produced. Therefore, the CPU tends to become overheated and might very possibly cause a breakdown and/or shortened life of the computer. It is therefore desirable to develop a heat-radiating structure for CPU to effectively dissipate large amount of heat produced by the CPU and protects the CPU from damage caused by overheating.

SUMMARY OF THE INVENTION

A primary object of the present invention is to provide a heat-radiating structure which may effectively cool an overheated CPU to ensure convenient and prolonged operation of a computer.

Another object of the present invention is to provide a heat-radiating structure for CPU, wherein at least one thermal pipe is provided to extend through a central portion of a radiating seat to quickly and effectively transmit and radiate heat produced by the CPU.

A further object of the present invention is to provide a heat-radiating structure for CPU, wherein a radiating member is connected to thermal pipes and a cooling fan, so that heat produced by the CPU and transmitted to the radiating member can be dispersed by the cooling fan via ventilation holes provided on a computer housing.

To achieve the above objects, the present invention mainly includes a radiating seat, at least one thermal pipe, a radiating member, and a cooling fan. The radiating seat is connected by fastening means to a radiating block attached to the CPU, so that heat produced by the CPU can be transmitted to the radiating seat via the radiating block. The at least one thermal pipe has one section fitly received in a central portion of the radiating seat and another section in the radiating member to enhance heat transmission from the radiating seat to the radiating member. The cooling fan is screwed to one side surface of the radiating member to speed dissipation of heat transmitted to the radiating member. Whereby, heat produced by the CPU can be quickly and effectively radiated to cool the CPU.

BRIEF DESCRIPTION OF THE DRAWINGS

Technical means adopted by the present invention to achieve the above objects and other functions can be best understood by referring to the following detailed description of the preferred embodiment and the accompanying drawings, wherein.

DETAILED DESCRIPTION OF THE PREFERRED EMBODIMENT

Figure 1:
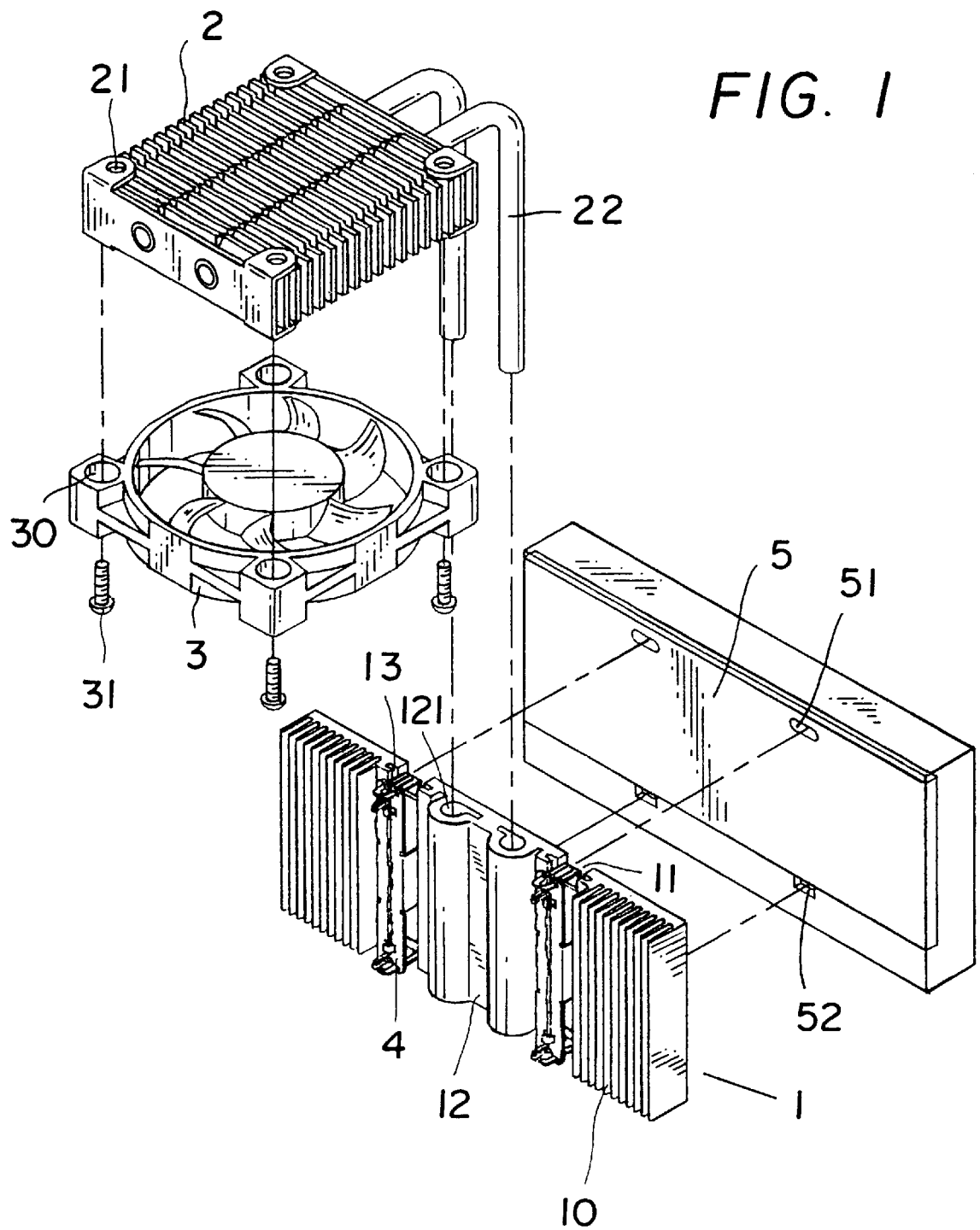
FIG. 1 is an exploded perspective of the present invention.
Figure 2:
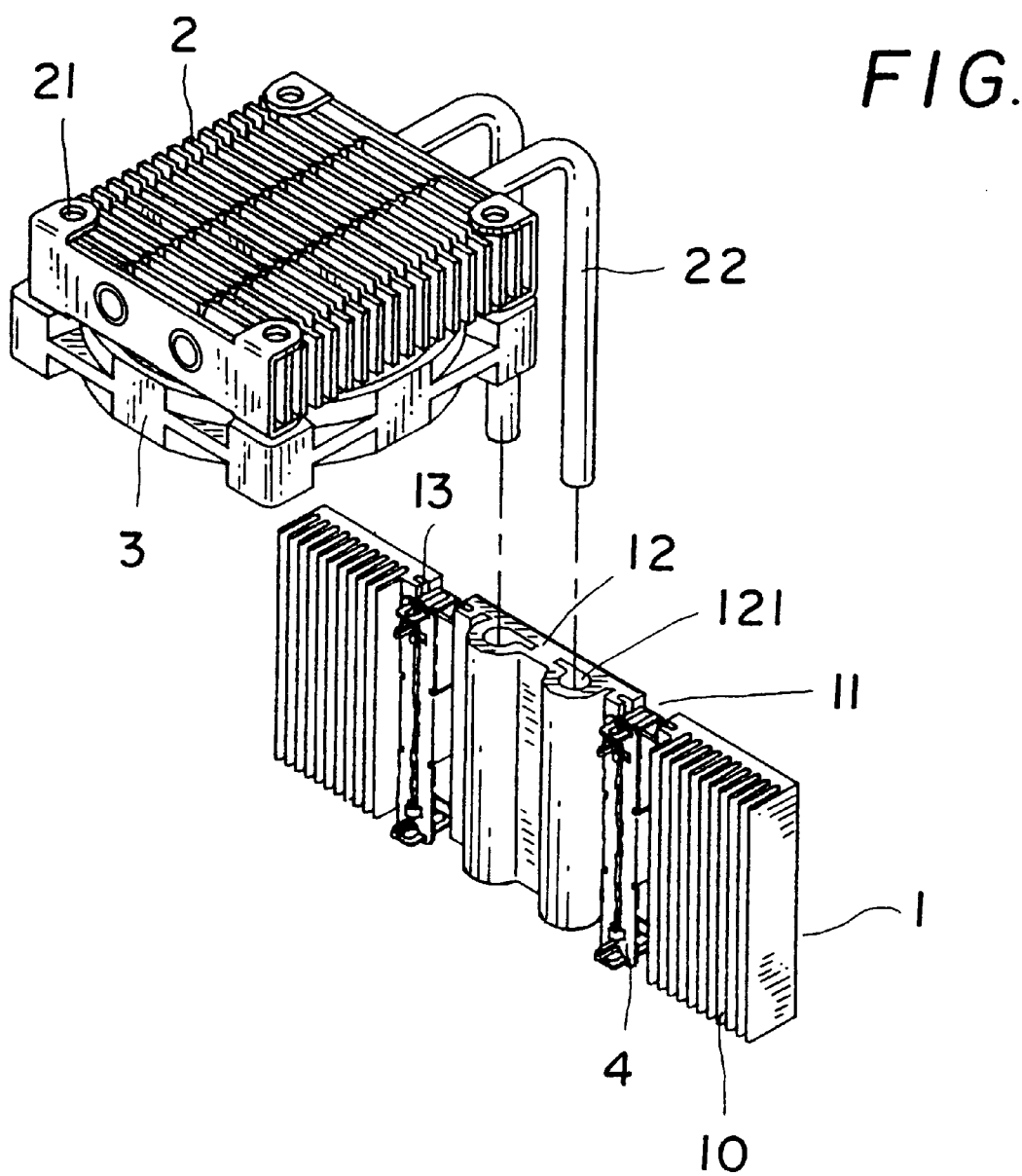
FIG. 2 is a partially assembled perspective of the present invention.
Figure 3:
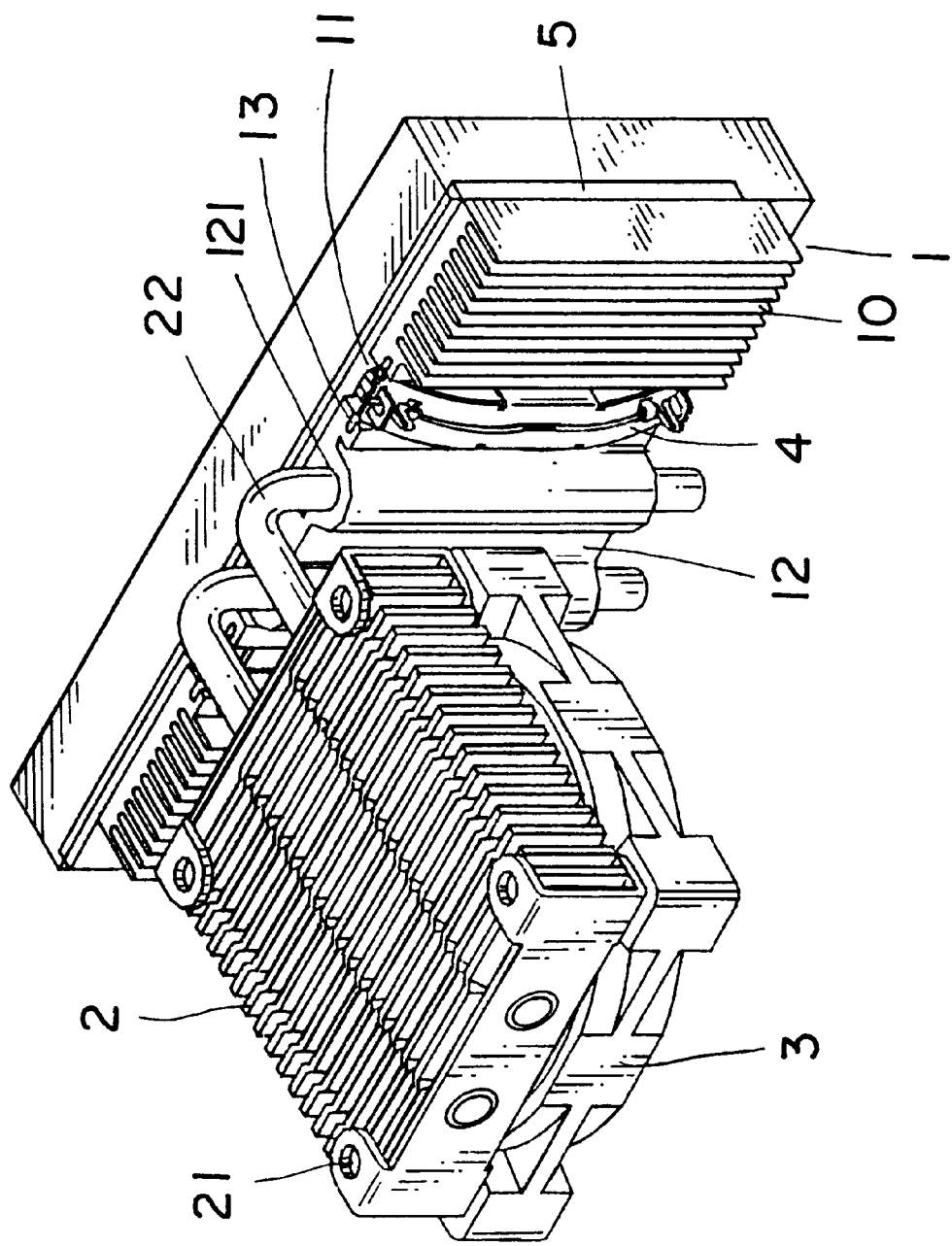
FIG. 3 is an assembled perspective of the present invention.

Please refer to FIGS. 1, 2 and 3 at the same time. The present invention relates to a heat-radiating structure for a CPU and mainly includes a radiating seat 1, one or more thermal pipes 22, a radiating member 2, and a cooling fan 3.

The radiating seat 1 includes a central portion 12 forming two through holes 121 for receiving a portion of the thermal pipes 22 therein. Channels 13 and grooves 11 are formed at two lateral ends of the central portion 12 for engaging with fastening means 4. The fastening means 4 firmly connect the radiating seat 1 to a radiating block 5 closely attached to a CPU (not shown) of a computer. Cooling fins 10 for speeding heat radiation are provided to two outer sides of the central portion 12 of the radiating seat 1. To permit heat produced by the CPU to be quickly transmitted to the radiating member 2 via the radiating block 5 and the radiating seat 1, the thermal pipes 22 are partially extended at one end into the holes 121 at the central portion 12 of the radiating seat 1. To facilitate extending of the thermal pipes 22 into the holes 121, the holes 121 are designed to have internal diameter slightly larger than outer diameter of the thermal pipes 22. After the thermal pipes 22 are extended into the holes 121, they are stamped to tightly and closely engage with the radiating seat 1, allowing heat produced by the CPU to be transmitted from one end of the thermal pipes 22 received in the holes 121 of the radiating seat 1 to another end of the thermal pipes 22 connected to the radiating member 2. There can be one or more thermal pipes 22, depending on the actual need. In the embodiment of the present invention shown in the drawings, there are two thermal pipes 22.

To enhance the radiating effect, the thermal pipes 22 are fixedly connected at their one end to the radiating member 2, while the radiating member 2 is mounted in a computer housing near ventilation openings provided thereon. Threaded holes 21 are provided at four corners on both side surfaces of the radiating member 2 and threaded holes 30 are provided on corners of the cooling fan 3, so that the cooling fan 3 can be fixed to either side surface of the radiating member 2 by threading screws through the threaded holes 21 and 30. Whereby, when the cooling fan 3 operates, heat transmitted to the radiating member 2 can dissipate into air more quickly.

Figure 4:
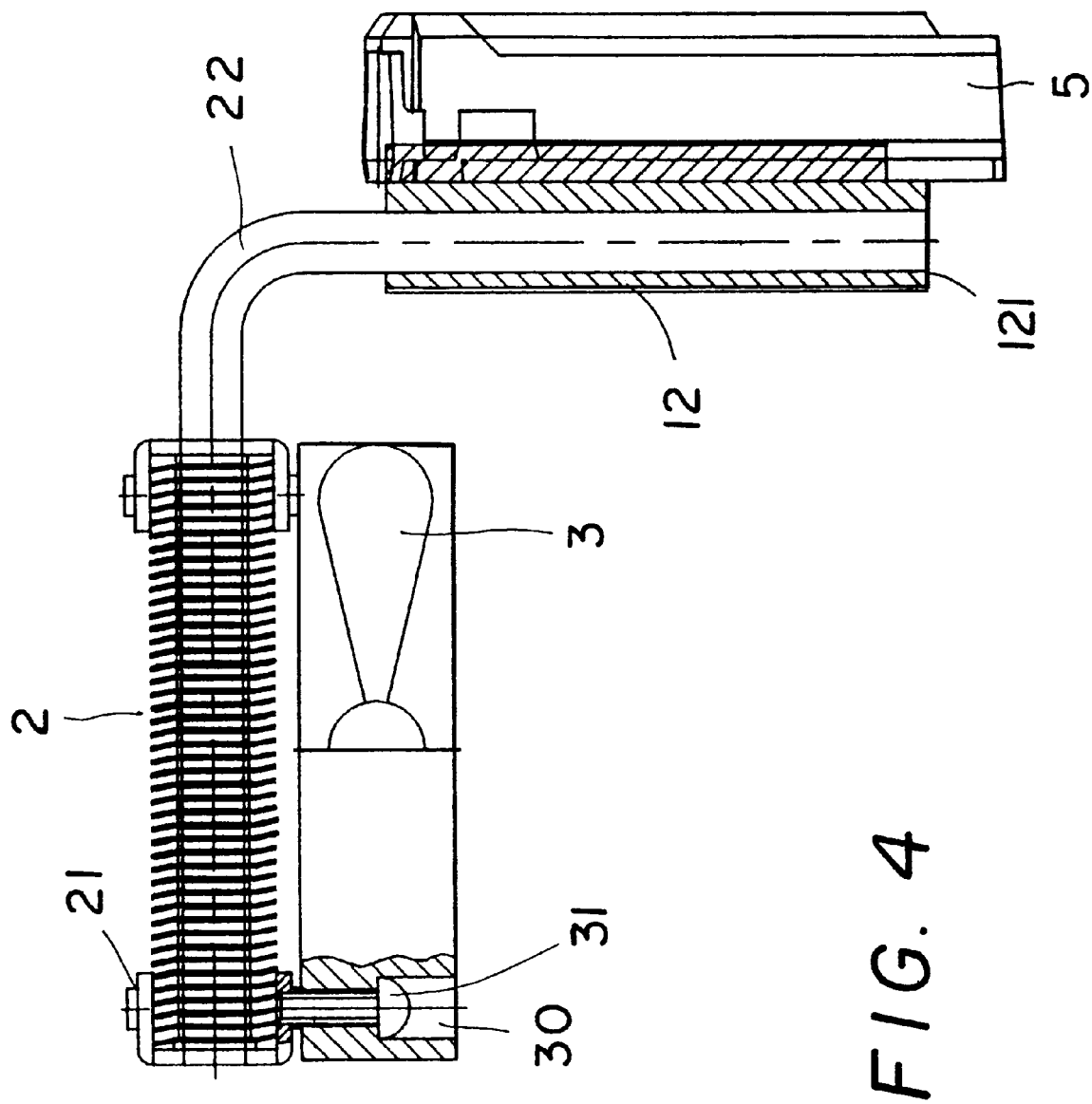
FIG. 4 is a partially sectional side view of the present invention in an assembled state.

FIG. 4 is a partially sectional side view of the present invention in an assembled state. As can be clearly seen from the drawing, the radiating seat 1 is closely fitted to the radiating block 5 of the CPU by fastening means 4 provided in channels 13 at two lateral ends of the central portion 12 of the radiating seat 1. The thermal pipes 22 are partially received in the holes 121 at the central portion 12 of the radiating seat 1 and are stamped to closely fit in the holes 121. Another end of the thermal pipes 22 opposite to the radiating seat 1 extend into the radiating member 2 located near ventilation openings of the computer housing. To permit effective transmission of heat from the thermal pipes 22 to the radiating member 2, the thermal pipes 22 are partially expanded to achieve close fit in the radiating member 2. Threaded holes 21 and 30 are correspondingly provided at corners of the radiating member 2 and the cooling fan 3, respectively, so that screws 31 may be threaded therethrough to tighten the cooling fan 3 to the radiating member 2. The cooling fan 3 may speed dissipation of heat transmitted to the radiating member 2. When the ventilation openings of the computer housing are provided at right side of the computer, the cooling fan 3 is fixed to a left side surface of the radiating member 2. And, when the ventilation openings are provided at left side of the computer housing, the cooling fan 3 is fixed to a right side surface of the radiating member 2. With these arrangements, heat transmitted via the thermal pipes 22 can be radiated by the radiating member 2 and sent outward by the cooling fan 3 at the same time. A better cooling effect can therefore be obtained.

In brief, the present invention completely eliminates drawbacks existing in the conventional CPU radiating means. The overheated CPU can be quickly and effectively cooled to a lower temperature to ensure prolonged usable life and convenient operation thereof.

What is claimed is:

1. A heat-radiating structure for quickly and effectively lowering high temperature of a CPU in a computer, comprising a radiating seat, at least one thermal pipe, a radiating member, and a cooling fan, said radiating seat including a central portion and cooling fins arranged at two sides of said central portion, channels and grooves being provided at two lateral ends and upper and lower ends, respectively, of said central portion to receive fastening means therein for fixedly connecting said radiating seat to a radiating block, said central portion being formed with at least one through hole for said at least one thermal pipe to extend one end thereinto, another end of said at least one thermal pipe being extended into and tightly connected to said radiating member, and said radiating member being provided at four corners with threaded holes, so that screws can be threaded through said threaded hole to firmly connect said cooling fan to said radiating member to provide enhanced cooling effect.

2. A heat-radiating structure for CPU as claimed in claim 1, wherein said at least one thermal pipe extended one end into said radiating seat is stamped to be closely fitted in said through hole of said central portion of said radiating seat.

3. A heat-radiating structure for CPU as claimed in claim 1, wherein said threaded holes are provided at said four corners on both side surfaces of said radiating member.

4. A heat-radiating structure for CPU as claimed in claim 1, wherein said radiating member with said cooling fan screwed thereto is adapted to be mounted in a computer housing near ventilation openings provided on the housing, so that heat produced by the CPU as well as other computer components can be radiated by said radiating member and sent out by said cooling fan at the same time to quickly and effectively cool the CPU.

* * * * *